United States Patent
Lee et al.

[11] Patent Number: 6,133,824
[45] Date of Patent: Oct. 17, 2000

[54] METHOD FOR MODELING ROADWAY AND METHOD FOR RECOGNIZING LANE MARKERS BASED ON THE SAME

[75] Inventors: Suk-han Lee, Sungnam; Jae-won Lee; Dong-mok Shin, both of Seoul; Woong Kwon, Kwangmyung; Dong-yoon Kim, Seoul; Kyoung-sig Roh, Sungnam, all of Rep. of Korea

[73] Assignee: Samsung Electronics Co., Ltd., Suwon, Rep. of Korea

[21] Appl. No.: 09/379,594

[22] Filed: Aug. 24, 1999

[30] Foreign Application Priority Data

Oct. 13, 1998 [KR] Rep. of Korea ............ 98-42719

[51] Int. Cl.⁷ .................................................. B60Q 1/00
[52] U.S. Cl. .................... 340/435; 340/439; 340/937; 348/118; 701/28; 382/168; 382/199; 382/281
[58] Field of Search ........................ 340/435, 439, 340/937, 436; 348/118; 180/168, 167; 382/168, 199, 281, 291, 103, 104; 701/28, 300, 301

[56] References Cited

U.S. PATENT DOCUMENTS

| | | | |
|---|---|---|---|
| 5,642,093 | 6/1997 | Kinoshita et al. | 340/439 |
| 5,790,403 | 8/1998 | Nakayama | 701/28 |
| 5,835,028 | 11/1998 | Bender et al. | 340/937 |
| 5,904,725 | 5/1999 | Iisaka et al. | 701/207 |
| 5,926,126 | 7/1999 | Engelman | 342/70 |
| 6,050,359 | 4/2000 | Mouri et al. | 180/415 |

*Primary Examiner*—Benjamin C. Lee
*Attorney, Agent, or Firm*—Burns, Doane, Swecker & Mathis, L.L.P.

[57] ABSTRACT

A method for modeling a roadway and a method for recognizing lane markers based on the modeling method. The method for recognizing lane markers of roadway for a vehicle by getting image information about the roadway and information about the speed and steering angle using a camera and a sensor attached to the vehicle, includes the steps of modeling the actual roadway on which the vehicle travels, as a structure having a plurality of rectangular plates linked to each other. The modeled plates are overlayed onto the image information about the actual roadway, photographed by the camera, pixels forming the lane markers are extracted, and linear lane marker information is then obtained from the pixels forming the land markers. Then, the linear lane marker information is overlayed onto the modeled plates to recalculate lane marker information using the plates as a frame, and predetermined limitations of the features of the lane markers are applied to the plates onto which the linear lane marker information has been overlayed, to optimize the lane marker information. Then, the roadway on which the vehicle is traveling, is remodeled using the optimized lane marker information, the information about the speed and steering angle of the vehicle measured by the sensor, and the information about the modeled plates, and the position and orientation of the remodeled plates are calculated. Therefore, roadway recognition can be easily achieved using a modeled structure of the roadway, in which a plurality of rectangular plates are linked. Also, the model roadway is repeatedly mapped onto the actual roadway image, so that reliability in recognition of roadway increases.

5 Claims, 6 Drawing Sheets

METHOD FOR MODELING ROADWAY AND METHOD FOR RECOGNIZING LANE MARKERS BASED ON THE SAME

BACKGROUND OF THE INVENTION

1. Field of the Invention

The present invention relates to a lane modeling method in an anti-collision system for vehicles and in a system for preventing derailing of vehicles and a method for recognizing lane markers based on the lane modeling method, and more particularly, to an articulated-modeling method in which the lane markers are modeled on a plurality of rectangles, and a method for recognizing the lane markers based on the modeling method.

2. Description of the Related Art

Research into lane recognition has been conducted using image recognition technologies. However, such image recognition requires a large amount of calculation, so that there is a drawback of requiring a high performance microprocessor or embedded hardware which is practicable.

SUMMARY OF THE INVENTION

It is an object of the present invention to provide a method for modeling lane markers by linking a plurality of rectangles, and a method for recognizing lane markers by adopting a simple algorithm based on the modeling method.

Accordingly, to achieve the above object, the present invention, as embodied and broadly defined herein, provides a method for a method for modeling a roadway as a structure having a plurality of rectangular plates linked to each other, the modeled structure being expressed as the following matrix equation (1):

$$P_i = [w_i, l_i, \alpha_i, \beta_i, \gamma_i]^T \tag{1}$$

wherein it is assumed that a vehicle is placed at the center of the bottom line of a plate $P_i$ having a width of $w_i$ and a length of $l_i$, the $Z_i$ axis is the traveling direction of the vehicle, the $X_i$ axis is lateral to the vehicle, the $Y_i$ axis is perpendicular to the plate $P_i$, $\beta_i$ and $\alpha_i$ represent error angles of the $X_i$ and $Z_i$ axes of the plate $P_i$ with respect to the $X_{(i-1)}$ and $Z_{(i-1)}$ axes of the plate $P_{(i-1)}$ linked immediately before the current plate $P_i$, respectively, and $\gamma_i$ represents error angle between the $Y_i$ axis perpendicular to the roadway and the direction perpendicular to the vehicle.

Preferably, assuming that a matrix having information about the length $l_i$ of plates $P_i$ is referred to as G, a transformation matrix for rotating the $X_i$ axis by $\alpha_i$ is referred to as $R_{X_i,\alpha_i}$, a transformation matrix for rotating the $Z_i$ axis by $\gamma_i$ is referred to as $R_{Z_i,\gamma_i}$, and a transformation matrix for rotating the $Y_i$ axis by $\beta_i$ is referred to as $R_{Y_i,\beta_i}$, the transformation relation $T_{i-1,i}$ between the previous plate $P_{i-1}$ and the current plate $P_i$ can be expressed as the following matrix equation (2):

$$T_{i-1,i} = G \, R_{X_i,\alpha_i} \, R_{Z_i,\gamma_i} \, R_{Y_i,\beta_i} \tag{2}$$

According to another aspect of the present invention, as embodied herein, a method for recognizing lane markers, comprises a method for recognizing lane markers of a roadway for a vehicle by getting image information about the roadway and information about the speed and steering angle using a camera and a sensor attached to the vehicle, comprising: modeling the actual roadway on which the vehicle travels, as a structure having a plurality of rectangular plates linked to each other; overlaying the modeled plates onto the image information about the actual roadway, photographed by the camera, extracting pixels forming the lane markers, and obtaining linear lane marker information from the pixels forming the land markers; overlaying the linear lane marker information onto the modeled plates to recalculate lane marker information using the plates as a frame; applying predetermined limitations of the features of the lane markers to the plates onto which the linear lane marker information has been overlayed, to optimize the lane marker information; and remodeling the roadway on which the vehicle is traveling, using the optimized lane marker information, the information about the speed and steering angle of the vehicle measured by the sensor, and the information about the modeled plates, and calculating the position and orientation of the remodeled plates.

Preferably, the actual roadway is modeled as the structure having a plurality of rectangular plates linked to each other, expressed as the following matrix equation (1):

$$P_i = [w_i, l_i, \alpha_i, \beta_i, \gamma_i]^T \tag{1}$$

wherein it is assumed that a vehicle is placed at the center of the bottom line of a plate $P_i$ having a width of $w_i$ and a length of $Y_i$, the $Z_i$ axis is the traveling direction of the vehicle, the $X_i$ axis is lateral to the vehicle, the $Y_i$ axis is perpendicular to the plate $P_i$, $\beta_i$ and $\alpha_i$ represent error angles of the $X_i$ and $Z_i$ axes of the plate $P_i$ with respect to the $X_{(i-1)}$ and $Z_{(i-1)}$ axes of the plate $P_{(i-1)}$ linked immediately before the current plate $P_i$, respectively, and $\gamma_i$ represents error angle between the $Y_i$ axis perpendicular to the roadway and the direction perpendicular to the vehicle.

Preferably, the predetermined limitations of the lane markers are that the lane markers based on the linear lane marker information overlayed onto the plates are parallel to the side frames of the plates and the width of the land markers based on the linear lane marker information is equal to the width of the roadway.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

Figure 1A:
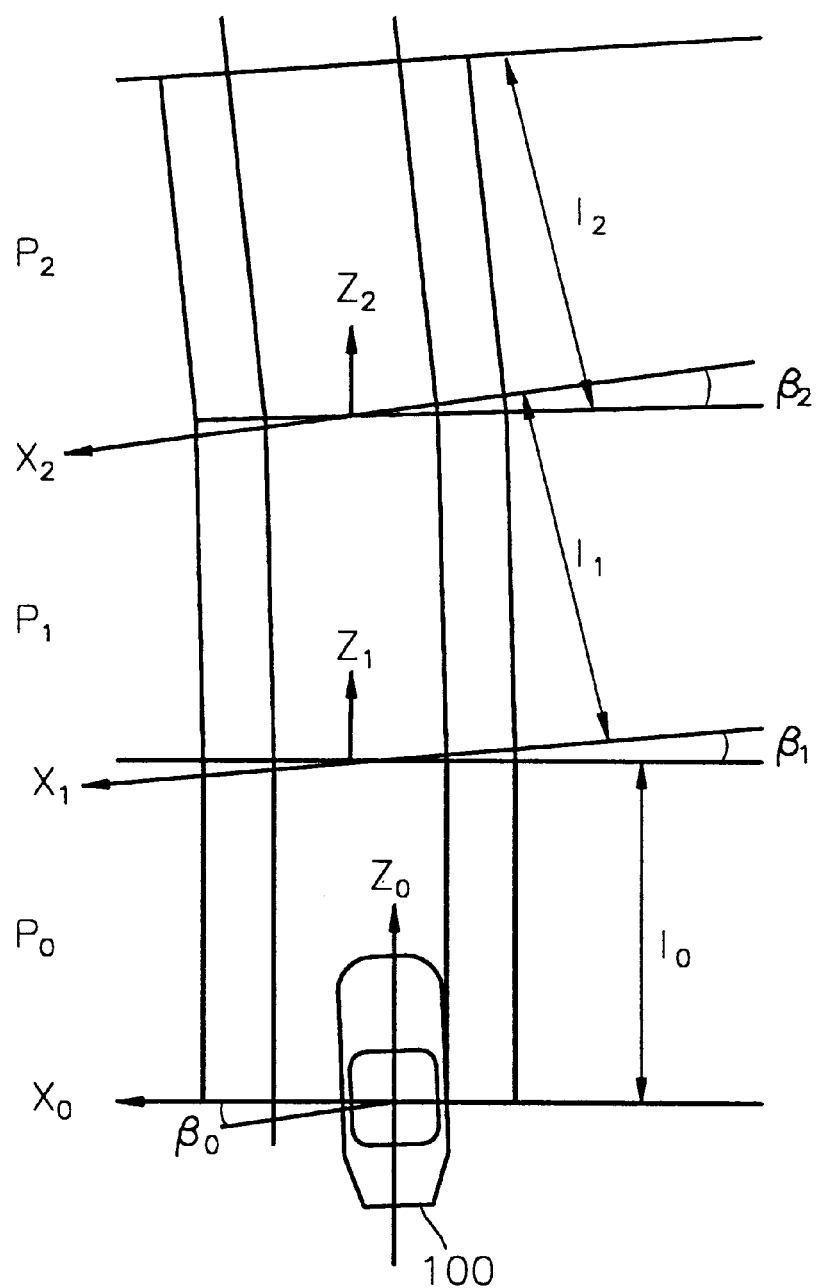
FIG. 1A is a perspective view of a 3-dimensional roadway, illustrating a method for modeling roadway according to a preferred embodiment of the present invention.
Figure 1B:
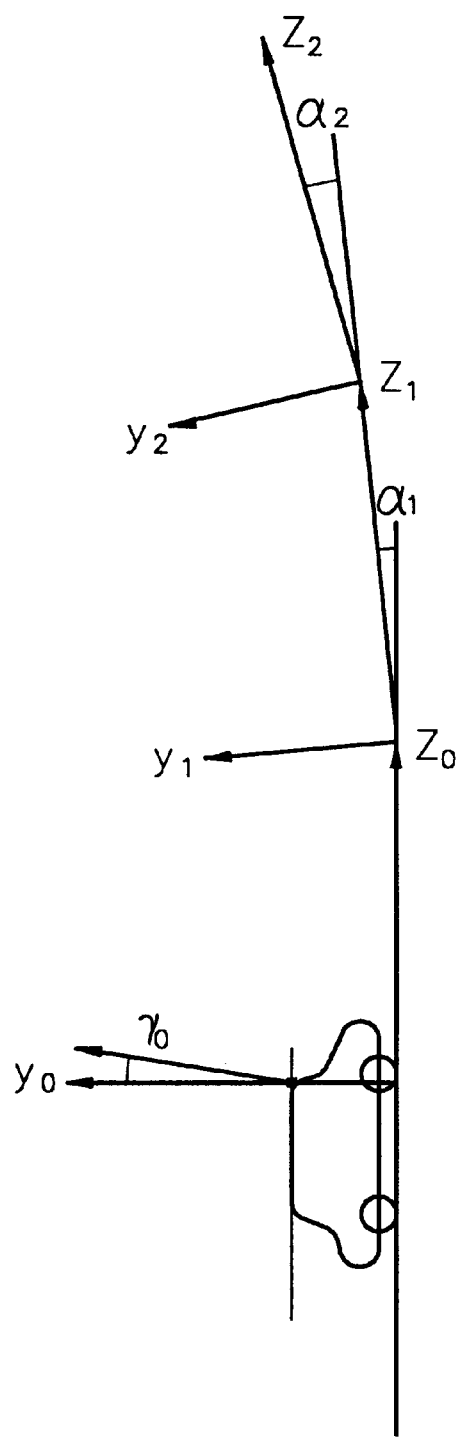
FIG. 1B is a side view of the 3-dimensional roadway shown in FIG. 1A.

Referring to FIGS. 1A and 1B, assuming that a vehicle 100 is placed at the center of the bottom line of a plate $P_i$ (where, i=0, 1, 2 ...) having a width of $w_i$ and a length of $l_i$ the $Z_i$ axis is the traveling direction of the vehicle 100, the $X_i$ axis is lateral to the vehicle 100, the $Y_i$ axis is perpendicular to the plate $P_i$, $\beta_i$ and $\alpha_i$ represent error angles of the $X_i$ and $Z_i$ axes of the plate $P_i$ with respect to the $X_{(i-1)}$ and $Z_{(i-1)}$ axes of the plate $P_{(i-1)}$ linked immediately before the current plate $P_i$, respectively, and $\gamma_i$ represents error angle between the $Y_i$ axis perpendicular to the roadway and the direction perpendicular to the vehicle, a roadway consisting of the plurality of plates is modeled as the matrix equation (1).

$$P_i = [w_i \, l_i \, \alpha_i \, \beta_i \, \gamma_i]^T \tag{1}$$

That is, the roadway is expressed as a finite number of rectangular plates $P_i$ linked to each other.

Assuming that a matrix having information about the length $l_i$ of plates $P_i$ is referred to as G, a transformation matrix for rotating the $X_i$ axis by $\alpha_i$ is referred to as $R_{X_i,\alpha_i}$, a transformation matrix for rotating the $Z_i$ axis by $\gamma_i$ is referred to as $R_{Z_i,\gamma_i}$, and a transformation matrix for rotating the $Y_i$ axis by $\beta_i$ is referred to as $R_{Y_i,\beta_i}$, the transformation relation $T_{i-1,i}$ between the previous plate $P_{i-1}$ and the current plate $P_i$ can be expressed as the matrix equation (2). Also, the matrix G having information about length $l_i$ of the plates $P_i$ is expressed as the matrix equation (3).

$$T_{i-1,i} = G \, R_{X_i,\alpha_i} \, R_{Z_i,\gamma_i} \, R_{Y_i,\beta_i} \tag{2}$$

$$G = \begin{bmatrix} 1 & 0 & 0 & 0 \\ 0 & 1 & 0 & 0 \\ 0 & 0 & 1 & l_{i-i} \\ 0 & 0 & 0 & 1 \end{bmatrix} \tag{3}$$

Each plate is modeled to incorporate lane markers on both sides along which the vehicle travels, and the lane markers approximate straight lines which are parallel to the direction of travel $Z_i$ of the vehicle. Such a model roadway can be expressed in a geometrical structure in which a plurality of plates are linked to each other.

Figure 2:
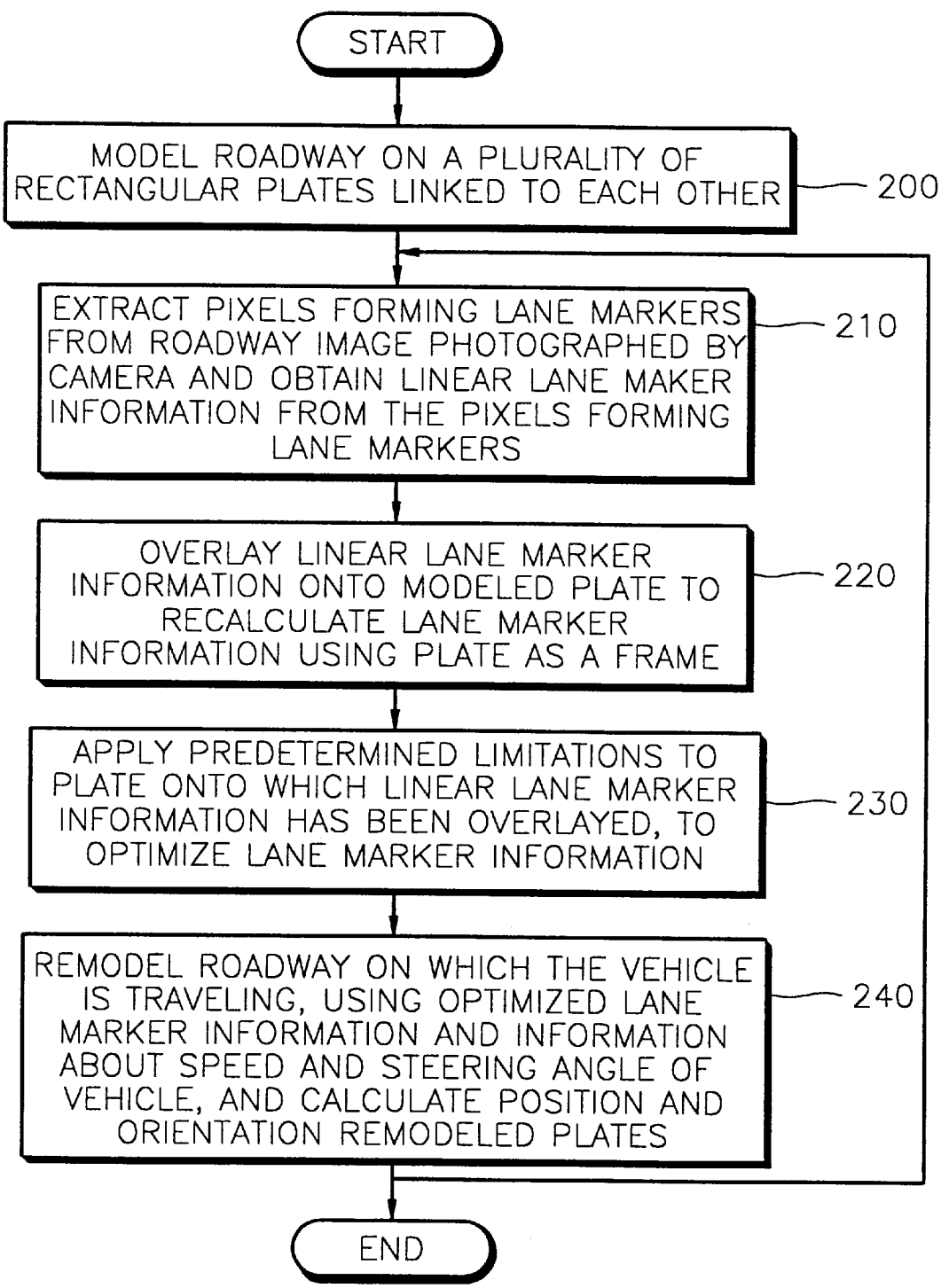
FIG. 2 is a flowchart of a method for recognizing lane markers according to the present invention.
Figure 3:
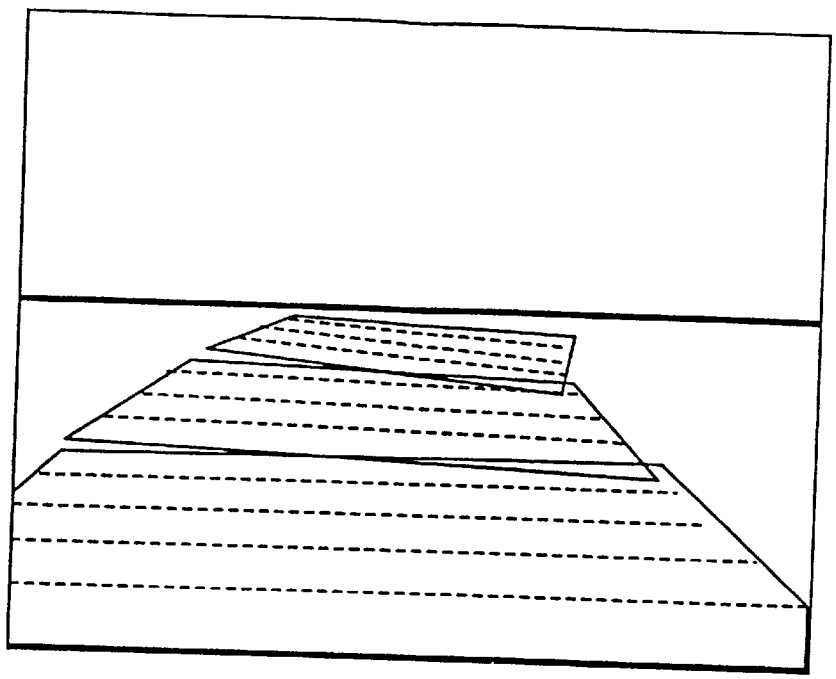
FIG. 3 illustrates plates used in modeling a roadway, which have been mapped onto an image coordinate system.
Figure 4:
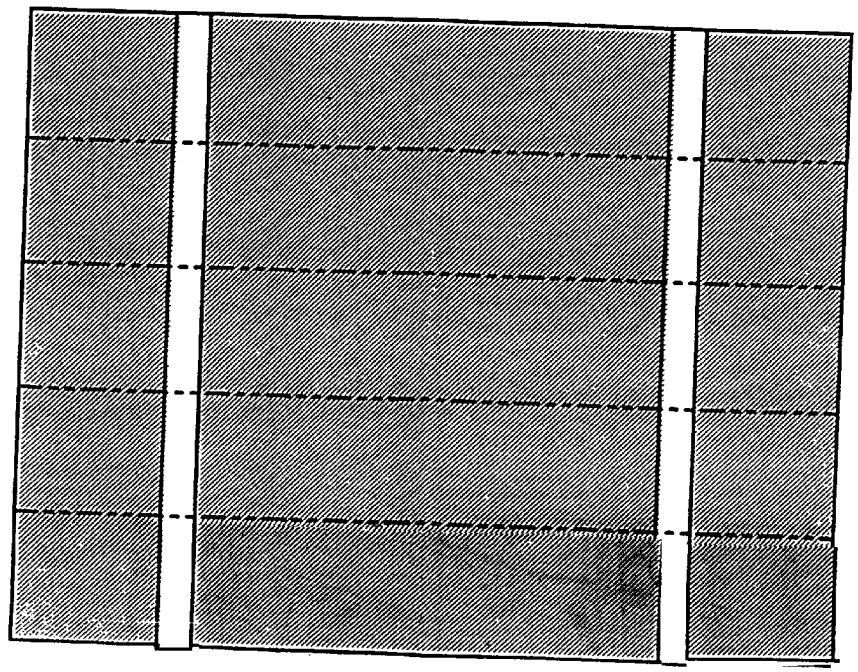
FIG. 4 illustrates the inside of one plate divided into a plurality of segments.

FIG. 2 is a flowchart illustrating a method for recognizing lane markers according to the present invention. Prior to recognition of the lane markers, the vehicle obtains various data, such as image information about the roadway and the speed and steering angle of the vehicle, using a camera and a sensor which have been attached to the vehicle. The roadway on which the vehicle travels is modeled as a structure in which a plurality of rectangular plates are linked to each other (step 200). Here, the modeling of the roadway is performed by the method illustrated with reference to FIGS. 1A and 1B. The modeled structure comprising the plates is overlayed onto a roadway image which has been photographed by the camera, to extract pixels forming the lane markers in the overlayed plates. Then, linear land marker image is obtained from the information about the extracted pixels of the lane markers (step 210). Here, in order to obtain the linear lane marker information from the image information of the roadway, the modeled structure comprising plates, obtained in the step 200, is mapped onto the image coordinate system for the actual roadway photographed by the camera. FIG. 3 shows an example of the plates mapped onto the image coordinate system. The plurality of plates mapped onto the image coordinate system are linked each other and lines parallel to the X-axis of each of the plates is defined. Each plate is divided into 10–20 segments having the same intervals by the parallel lines. FIG. 4 shows one plate consisting of a plurality of segments.

Figure 5:
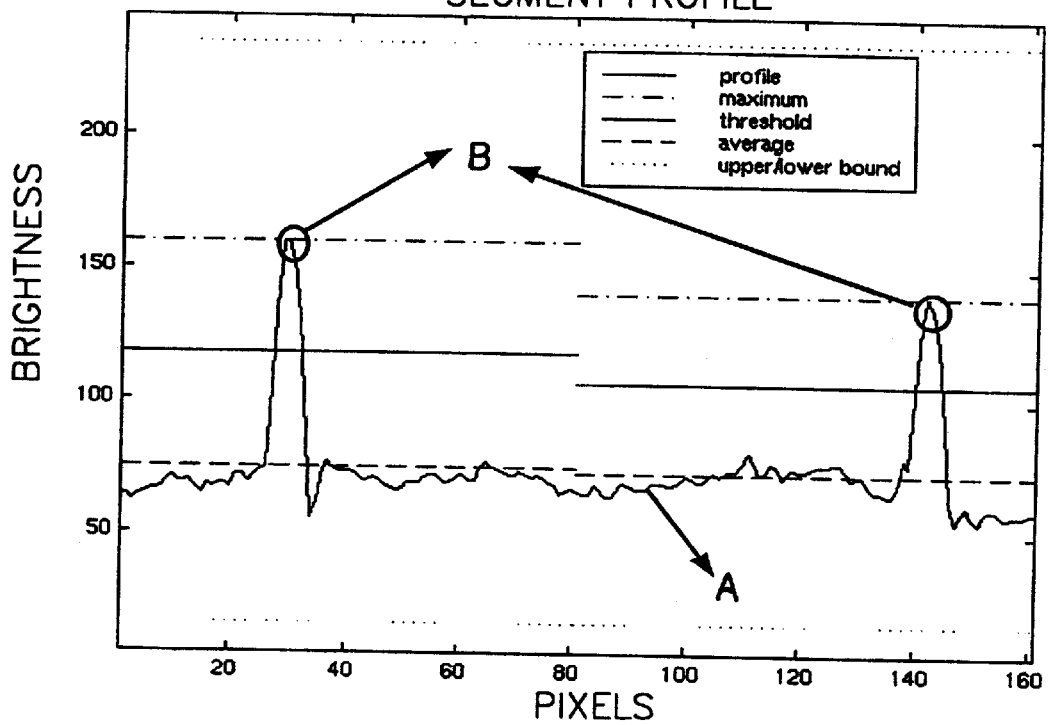
FIG. 5 is a profile of the brightness of pixels forming one segment of the plate shown in FIG. 4.

After the plates, each divided into a plurality of sections, are mapped onto the image coordinate system, a profile of the brightness of the pixels contained in each segment of the plates is obtained. In FIG. 5, "A" represents the profile of the brightness of pixels forming one segment of a plate, and the coordinates of pixels having a brightness level larger than a predetermined level, indicated by "B", can be obtained. The coordinates of pixels, such as the pixels indicated by "B" are obtained from each segment of the plate, and the coordinates of the pixels having a brightness level larger than the predetermined level are assumed as lane markers. A linear equation for the linear lane markers (or linear lane marker information) is obtained by a predetermined method using the coordinates of pixels having a brightness over the predetermined level. For example, the least square method can be used to calculate a linear equation for the lane markers, approximating to the actual lane markers, from the coordinates of pixels having a predetermined level of brightness. The linear lane marker information obtained in the step 210 is overlayed onto the modeled plates obtained in the step 200, to recalculate an equation for the roadway fitted into the plate as a frame (step 220). On the plates onto which the linear roadway information has been overlayed in the step 220, predetermined limitations relating to the features of the lane markers are applied to optimize the linear lane marker information (step 230). The predetermined limitations of the lane markers are that the optimized linear lane marker should be parallel to the side frames of the plates onto which the linear lane marker information has been overlayed, and the distance between right and left lane markers should be equal to the width of the roadway. If the above limitations are not satisfied, the position of the plates are corrected. Then, information about the roadway on which the vehicle travels is remodeled on rectangular plate, using the roadway information optimized in the step 230, the information about the speed and steering angle of the vehicle, which has been input by a sensor (not shown) attached to a predetermined driving portion (not shown) of the vehicle and the information about the modeled plates, and then the positions and orientations of the remodeled plate are calculated (step 240). Also, the information about the position and orientation of the $k^{th}$ remodeled plate can be used to obtain that of the $(k+1)^{th}$ plate.

Figure 6:
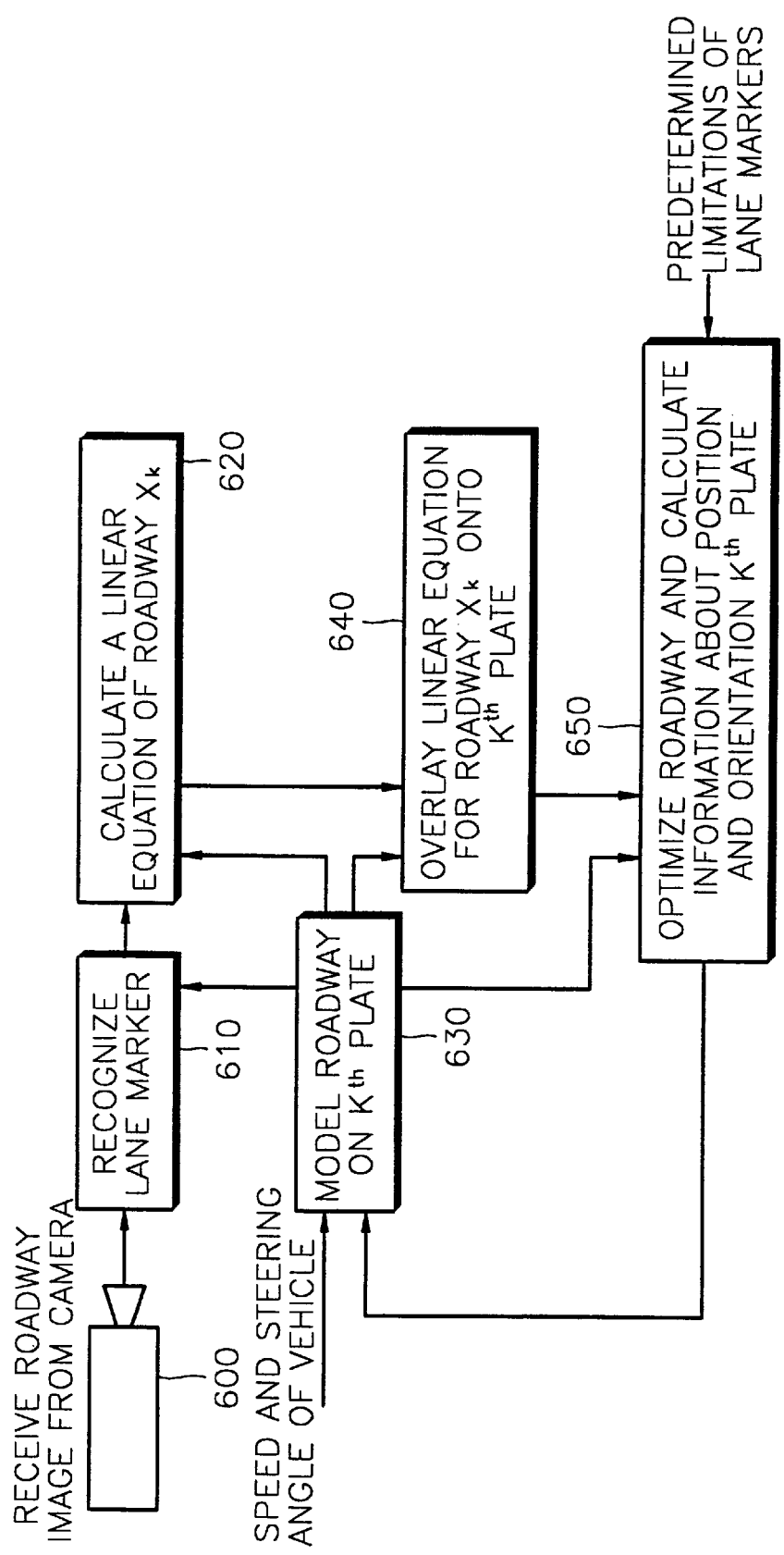
FIG. 6 is a flow diagram illustrating the method for recognizing lane markers according to the present invention.

FIG. 6 is a flow diagram illustrating the method for recognizing lane markers. For quantitative recognition on the lane markers, a picture of a roadway is photographed using a camera (step 600) and the lane markers are recognized from the obtained image information (step 610). Afterwards, coordinates of the pixels recognized as the lane markers are read and a linear equation of the roadway $(X_k)$ is calculated from the pixel coordinates using a predetermined method, e.g. the least square method (step 620). Assuming that the vehicle is traveling on a roadway which can be modeled on the $k^{th}$ plate, modeling on the $k^{th}$ plate is performed using the information about the speed and steering angle of the vehicle and about the position and orientation of the $(k-1)^{th}$ plate (step 630). Then, the linear equation for the roadway $(X_k)$ is overlayed onto the $k^{th}$ plate to recalculate linear roadway equation for the plate $Y_k$ (i.e., applying the plate as a frame) (step 640). The optimization of roadway is achieved and the information about the position and orientation of the ke plate are calculated by taking into account the predetermined limitations of the lane markers, the speed and steering angle of the vehicle and the position and orientation of the $(k-1)^{th}$ plate.

As described above, in the method for modeling the roadway and the method for recognizing the roadway based on the modeling method according to the present invention, roadway recognition can be easily achieved using a modeled structure of the roadway, in which a plurality of rectangular plates are linked. Also, the model roadway is repeatedly mapped onto the actual roadway image, so that reliability in recognition of roadway increases.

What is claimed is:

1. A method for modeling a roadway as a structure having a plurality of rectangular plates linked to each other, the modeled structure being expressed as the following matrix equation (1):

$$P_i = [w_i l_i \alpha_i \beta_i \gamma_i]^T \quad (1)$$

wherein it is assumed that a vehicle is placed at the center of the bottom line of a plate $P_i$ having a width of $w_i$ and a length of $l_i$, the $Z_i$ axis is the traveling direction of the vehicle, the $X_i$ axis is lateral to the vehicle, the $Y_i$ axis is perpendicular to the plate $P_i$, $\beta_i$ and $\alpha_i$ represent error angles of the $X_i$ and $Z_i$ axes of the plate $P_i$ with respect to the $X_{(i-1)}$ and $Z_{(i-1)}$ axes of the plate $P_{(i-1)}$ linked immediately before the current plate $P_i$, respectively, and $\gamma_i$ represents error angle between the $Y_i$ axis perpendicular to the roadway and the direction perpendicular to the vehicle.

2. The method of claim 1, wherein assuming that a matrix having information about the length $l_i$ of plates $P_i$ is referred to as G, a transformation matrix for rotating the $X_i$ axis by $\alpha_i$ is referred to as $R_{X_i,\alpha_i}$, a transformation matrix for rotating the $Z_i$ axis by $\gamma_i$ is referred to as $R_{Z_i,\gamma_i}$, and a transformation matrix for rotating the $Y_i$ axis by $\beta_i$ is referred to as $R_{Y_i,\beta_i}$, the transformation relation $T_{i-1,i}$ between the previous plate $P_{i-}$ and the current plate $P_i$ can be expressed as the following matrix equation (2):

$$T_{i-1,i} = G\ R_{X_i,\alpha_i}\ R_{Z_i\ \gamma_i}\ R_{Y_i,\beta_i} \quad (2)$$

3. A method for recognizing lane markers of a roadway for a vehicle by getting image information about the roadway and information about the speed and steering angle using a camera and a sensor attached to the vehicle, comprising:

modeling the actual roadway on which the vehicle travels, as a structure having a plurality of rectangular plates linked to each other;

overlaying the modeled plates onto the image information about the actual roadway, photographed by the camera, extracting pixels forming the lane markers, and obtaining linear lane marker information from the pixels forming the land markers;

overlaying the linear lane marker information onto the modeled plates to recalculate lane marker information using the plates as a frame;

applying predetermined limitations of the features of the lane markers to the plates onto which the linear lane marker information has been overlayed, to optimize the lane marker information; and remodeling the roadway on which the vehicle is traveling, using the optimized lane marker information, the information about the speed and steering angle of the vehicle measured by the sensor, and the information about the modeled plates, and calculating the position and orientation of the remodeled plates.

4. The method of claim 3, wherein the actual roadway is modeled as the structure having a plurality of rectangular plates linked to each other, expressed as the following matrix equation (1):

$$P_i = [w_i l_i \alpha_i \beta_i \gamma_i]^T \quad (1)$$

wherein it is assumed that a vehicle is placed at the center of the bottom line of a plate $P_i$ having a width of $w_i$ and a length of $l_i$, the $Z_i$ axis is the traveling direction of the vehicle, the $X_i$ axis is lateral to the vehicle, the $Y_i$ axis is perpendicular to the plate $P_i$, $\beta_i$ and $\alpha_i$ represent error angles of the $X_i$ and $Z_i$ axes of the plate $P_i$ with respect to the $X_{(i-1)}$ and $Z_{(i-1)}$ axes of the plate $P_{(i-1)}$ linked immediately before the current plate $P_i$, respectively, and $\gamma_i$ represents error angle between the $Y_i$ axis perpendicular to the roadway and the direction perpendicular to the vehicle.

5. The method of claim 4, wherein the predetermined limitations of the lane markers are that the lane markers based on the linear lane marker information overlayed onto the plates are parallel to the side frames of the plates and the width of the land markers based on the linear lane marker information is equal to the width of the roadway.

* * * * *